United States Patent
Bucknell et al.

(10) Patent No.: US 8,000,333 B2
(45) Date of Patent: Aug. 16, 2011

(54) METHOD, SYSTEM AND STATION FOR COMMUNICATING DATA PACKETS USING ARQ

(75) Inventors: Paul Bucknell, Brighton (GB); Matthew P. J. Baker, Canterbury (GB); Timothy J. Moulsley, Caterham (GB)

(73) Assignee: ST-Ericsson SA, Plan-les-Ouates (CH)

( * ) Notice: Subject to any disclaimer, the term of this patent is extended or adjusted under 35 U.S.C. 154(b) by 1190 days.

(21) Appl. No.: 11/579,778

(22) PCT Filed: May 5, 2005

(86) PCT No.: PCT/IB2005/051477
§ 371 (c)(1),
(2), (4) Date: Nov. 6, 2006

(87) PCT Pub. No.: WO2005/109726
PCT Pub. Date: Nov. 17, 2005

(65) Prior Publication Data
US 2008/0031168 A1    Feb. 7, 2008

(30) Foreign Application Priority Data
May 6, 2004 (GB) .................................. 0410110.1
Jun. 17, 2004 (GB) .................................. 0413591.9

(51) Int. Cl.
*H04L 12/28* (2006.01)
(52) U.S. Cl. ........ 370/401; 370/310; 370/225; 714/748; 714/749
(58) Field of Classification Search .................. 714/748, 714/749; 370/225, 310
See application file for complete search history.

(56) References Cited

U.S. PATENT DOCUMENTS

| | | | |
|---|---|---|---|
| 6,741,554 B2* | 5/2004 | D'Amico et al. | 370/225 |
| 6,757,248 B1* | 6/2004 | Li et al. | 370/235 |
| 6,792,284 B1* | 9/2004 | Dalsgaard et al. | 455/525 |
| 7,143,330 B2* | 11/2006 | Ahn et al. | 714/748 |
| 2003/0005382 A1* | 1/2003 | Chen et al. | 714/748 |
| 2004/0002958 A1 | 1/2004 | Seshadri et al. | |

(Continued)

FOREIGN PATENT DOCUMENTS
EP    0 876 023    11/1998

OTHER PUBLICATIONS

Wang J L et al International Council for Computer Communication: "Throughput Optimization of the Adaptive Multi-Receiver . . . " Computer Comm. Tech. For the 90's; Tel Aviv; Oct. 30-Nov. 3, 1988; Proceedings of the International Conf. On Computer Comm. Amsterdam Elsevier NL; vol. Conf. 9 Oct. 30, 1988; pp. 244-250.

*Primary Examiner* — Kamran Afshar
*Assistant Examiner* — Khalid Shaheed
(74) *Attorney, Agent, or Firm* — Timothy L. Boller; Seed IP Law Group PLLC

(57) ABSTRACT

A system (50) for communicating data packets from a first station (100) to a destination (400) via at least one of a plurality of second stations (200) which are coupled to the destination (400), in which the second stations (200) acknowledge receipt of the data packets. The first station (100) decides whether to retransmit a data packet or to proceed with transmitting the next data packet, the decision being dependent on receiving a plurality of positive acknowledgements or a plurality of negative acknowledgements.

39 Claims, 2 Drawing Sheets

U.S. PATENT DOCUMENTS

| | | | |
|---|---|---|---|
| 2004/0192308 A1* | 9/2004 | Lee et al. | 455/436 |
| 2005/0047387 A1* | 3/2005 | Frederiksen et al. | 370/349 |
| 2005/0169405 A1* | 8/2005 | Dominique et al. | 375/341 |
| 2005/0180328 A1* | 8/2005 | Kim et al. | 370/236 |
| 2005/0265249 A1* | 12/2005 | Nagaraj | 370/252 |
| 2005/0276317 A1* | 12/2005 | Jeong et al. | 375/213 |

* cited by examiner

METHOD, SYSTEM AND STATION FOR COMMUNICATING DATA PACKETS USING ARQ

The invention relates to a communication system, to a communication station for use in a system, and to a method of communicating data packets. The invention has particular application in mobile communications, for example in the transmission of data from a mobile station to a fixed node during soft handover between a plurality of base stations, or to diversity reception at a plurality of base stations.

It is known for cellular mobile communication systems to use soft handover in which a mobile station, when transferring from one cell to another, temporarily communicates with more than one cell to minimize any disruption to ongoing communications.

It is also known for communication systems to use retransmission protocols, commonly known as ARQ (Automatic Repeat Request) protocols. In ARQ protocols, data packets are acknowledged by the receiving equipment and retransmitted by the sending equipment if the acknowledgement, or lack of acknowledgement, indicates that the packet was not received successfully.

It is desirable to use ARQ protocols during soft handover in order to improve throughput and reduce delays. In this case each base station with which the mobile station is in communication, termed the active base stations, may transmit an acknowledgement in response to receiving a data packet. A data packet may be transferred from any active base station to the data packet destination, so the data packet can reach its destination provided that the data packet is received successfully by at least one base station.

An object of the invention is to enable an improved retransmission protocol.

According to a first aspect of the invention there is provided a method of communicating data packets from a first station to a node apparatus, the node apparatus being coupled to a plurality of second stations, the method comprising:
  transmitting a first data packet from the first station;
  receiving the transmitted first data packet at a plurality of second stations;
  evaluating whether the first data packet has been received successfully at each of the second stations according to a first criterion;
  forwarding the first data packet to the node apparatus from at least one second station at which the data packet is received successfully;
  transmitting at least one of:
    a positive acknowledgement from each of the second stations at which the first data packet is received successfully; and
    a negative acknowledgement from each of the second stations at which the first data packet is not received successfully;
  receiving the acknowledgements at the first station;
  comparing at least one of:
    the number of received positive acknowledgements with a first threshold value; and
    the number of received negative acknowledgements with a second threshold value;
    wherein at least one of the first and second threshold values is greater than unity; and
  employing the result of the comparison to determine whether to retransmit the first data packet or to transmit a second data packet.

According to a second aspect of the invention there is provided a communication system comprising a first station and a node apparatus coupled to a plurality of second stations for communicating data packets from the first station to the node apparatus,
the first station comprising transmitter means for transmitting a first data packet,
each second station comprising:
  means for receiving the first data packet;
  means for evaluating whether the first data packet has been received successfully according to a first criterion;
  means for forwarding the first data packet to the node apparatus if the first data packet has been received successfully;
  means for transmitting at least one of:
    a positive acknowledgement if the first data packet is received successfully; and
    a negative acknowledgement if the first data packet is not received successfully;
the node apparatus comprising means for receiving the forwarded first data packet;
the first station further comprising:
  means for receiving the acknowledgements;
  means for comparing at least one of:
    the number of received positive acknowledgements with a first threshold value; and
    the number of received negative acknowledgements with a second threshold value;
    wherein at least one of the first and second threshold values is greater than unity; and
  means for employing the result of the comparison to determine whether to retransmit the first data packet or to transmit a second data packet.

According to a third aspect of the invention there is provided a first station for use in a communication system comprising a node apparatus coupled to a plurality of second stations for communicating data packets from the first station to the node apparatus, the first station comprising:
  transmitter means for transmitting a first data packet to the second stations);
  means for receiving acknowledgements from the second stations;
  means for comparing at least one of:
    the number of received positive acknowledgements with a first threshold value; and
    the number of received negative acknowledgements with a second threshold value;
    wherein at least one of the first and second threshold values is greater than unity; and
  means for employing the result of the comparison to determine whether to retransmit the first data packet or to transmit a second data packet.

Thus, in accordance with the invention, the first station will not decide whether to retransmit a data packet or to transmit a new data packet on the basis of receiving only one acknowledgement, but requires more than one acknowledgment of the same type, positive or negative, to be received before making that decision. With a plurality of second stations, there is an increased probability, compared with the case of only a single second station, that one of the acknowledgements will be misinterpreted, resulting in an increased probability of making the wrong decision. By making the decision dependent on a plurality of acknowledgements of the same type received from one or more second stations, the probability of making the wrong decision is decreased. Wrong decisions can result in increased delays, reduced throughput and reduced coverage. Therefore the invention can enable improved delays, improved throughput and improved coverage.

The decision to retransmit or not may be based on the number of positive acknowledgements, or negative acknowledgements, or a combination of both. Different threshold values may be applied to the number of positive and negative acknowledgements.

In one embodiment, the number of acknowledgements is accumulated for the initial transmission of a data packet and for one or more retransmissions of the same data packet, and the accumulated number employed in determining whether to retransmit a data packet or to transmit a new data packet.

In an embodiment of the invention positive acknowledgements are transmitted by the second stations to indicate successful receipt of the first data packet, and the number P of positive acknowledgements that are received at the first station are counted and compared with a threshold value $T_P(T_P>1)$. Retransmission of the first data packet by the first station takes place if $P<T_P$, and transmission of a new data packet takes place if $P \geq T_P$.

In another embodiment of the invention negative acknowledgements are transmitted by the second stations to indicate unsuccessful receipt of the first data packet, and the number N of negative acknowledgements that are received at the first station are counted and compared with a threshold value $T_N(T_N>1)$. Retransmission of the first data packet by the first station takes place if $N>T_N$, and transmission of a new data packet takes place if $N \leq T_N$.

The invention will now be described, by way of example only, with reference to the accompanying drawings wherein.

Figure 1:
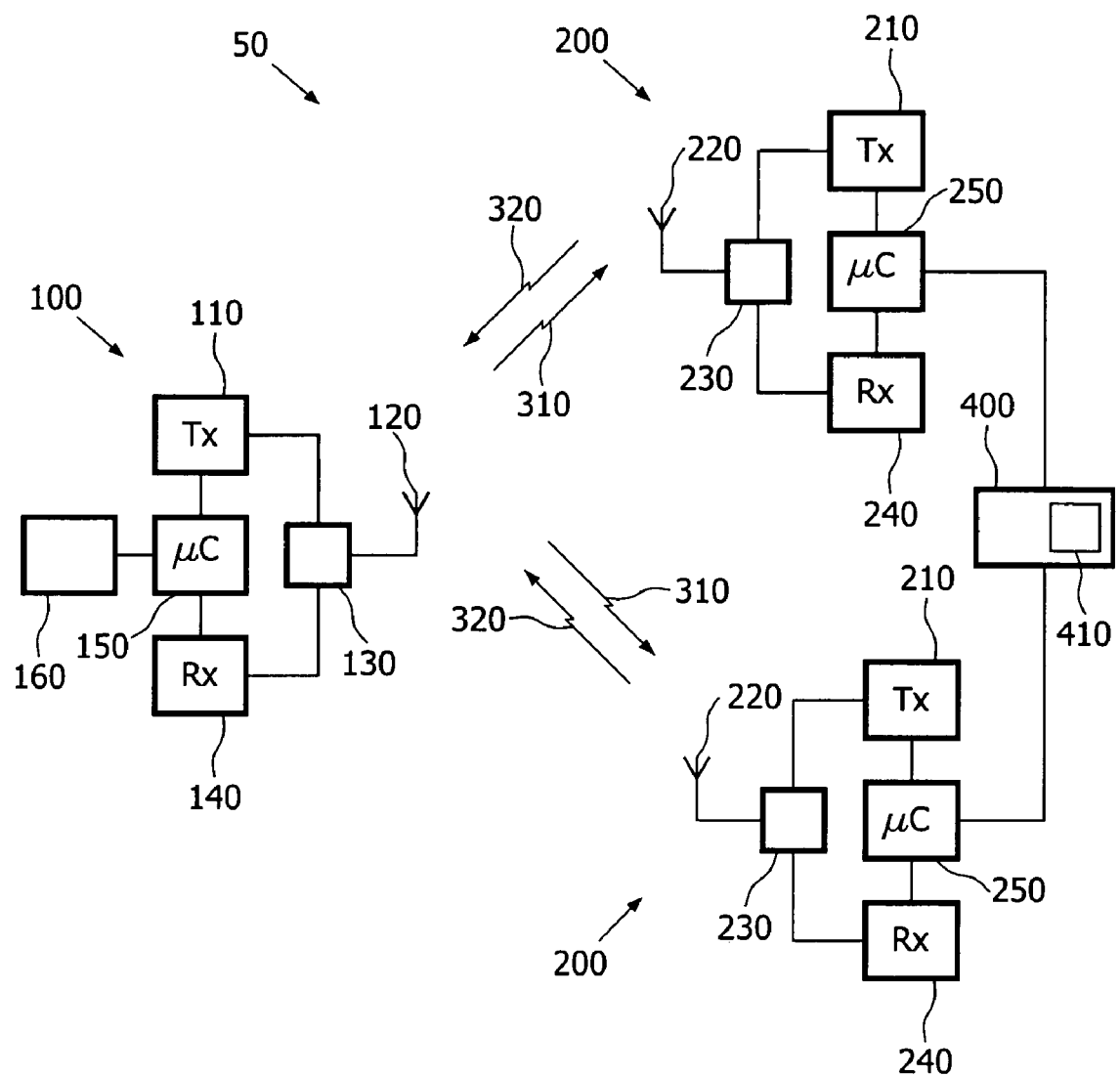
FIG. 1 is a block schematic diagram of a communication system.

Referring to FIG. 1, there is illustrated a radio communication system 50 comprising a first station 100, and a plurality of second stations 200 coupled to a destination node apparatus 400. The first station 100 may be, for example, a mobile communications equipment and the second stations 200 may be base stations in a mobile communications network. The term "node apparatus" is used to refer to any apparatus coupled to each of the plurality of second stations 200 to which the first data packet is to be routed.

The first station 100 comprises a transmitter 110 for transmitting data packets on an uplink 310. The transmitter 110 has an output coupled to an antenna 120 via coupling means 130 which may be, for example, a circulator or changeover switch. The coupling means 130 is also coupled to an input of a receiver 140 for receiving downlink 320 signals from the antenna 120.

Coupled to the transmitter 110 and the receiver 140 is a control means (μC) 150, for example a processor, for processing signals received from the second stations 200. Coupled to the control means 150, or integral with the control means 150, is a storage means 160 for storing one or more threshold values and one or more counts of acknowledgements.

The second stations 200 each comprise a receiver 240 for receiving signals transmitted by the first station 100 on the uplink 310. The receiver 240 has an input coupled to an antenna 220 via coupling means 230 which may be, for example, a circulator or changeover switch. The coupling means 230 is also coupled to an output of a transmitter 210 for transmitting downlink signals via the antenna 220. Coupled to the transmitter 210 and the receiver 240 is a control means (μC) 250, for example a processor, for processing data packets received from the first station 100 and for deriving acknowledgement signals which are transmitted on the downlink 320 by the transmitter 210.

The node apparatus 400 comprises a receiver 410 for receiving data packets forwarded by the second stations 200. It also comprises additional elements for acting on received data packets, such as means for storing, forwarding or processing. These are not shown in FIG. 1 as they are not material to the invention.

Figure 2:
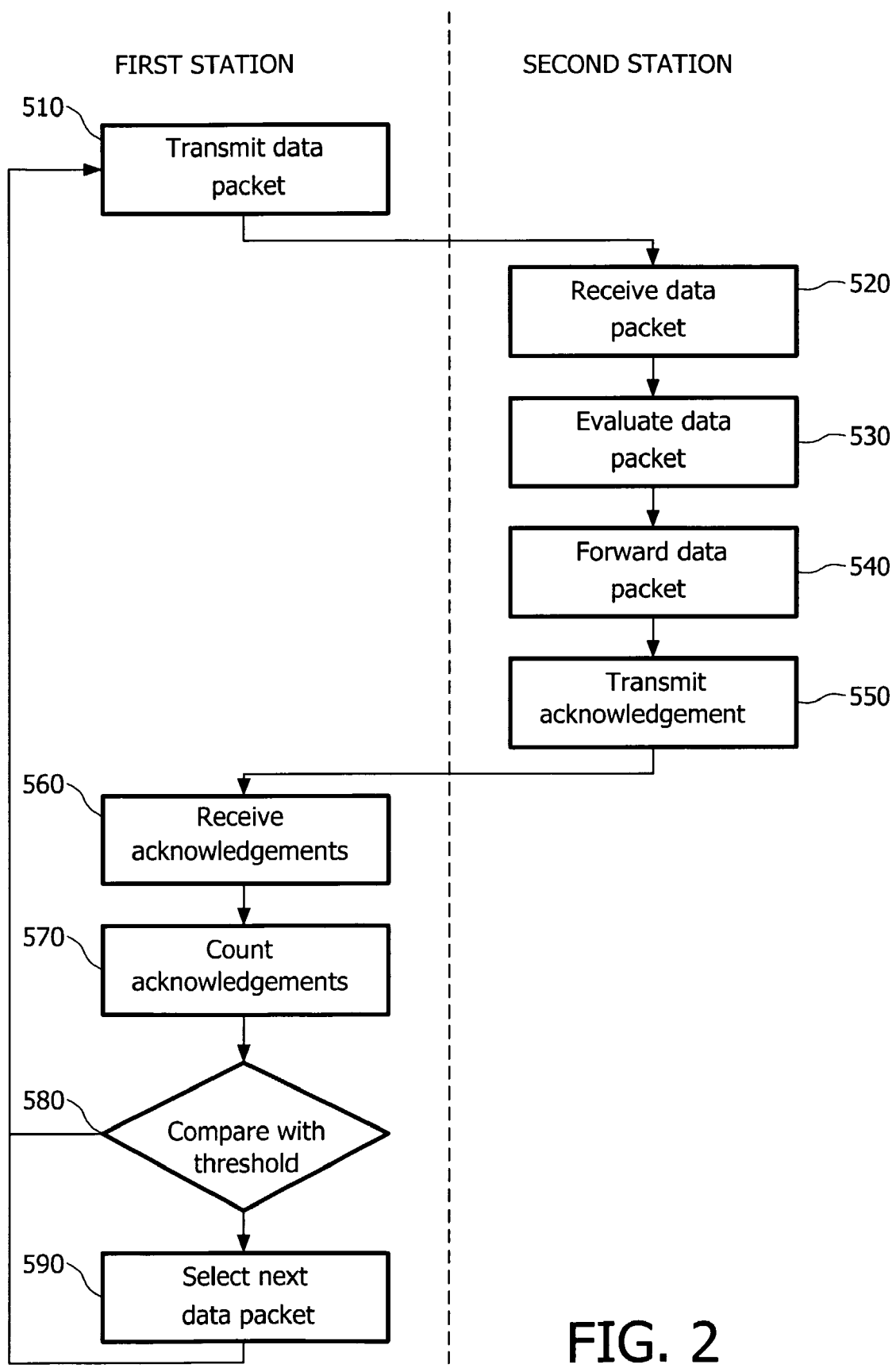
FIG. 2 is a flow chart of a method of communicating data packets.

The operation of the radio communication system 50 will now be described with reference to the flow chart of FIG. 2. In FIG. 2, steps on the left hand side of the flow chart relate to steps performed by the first station 100, and the steps on the right hand side relate to steps performed by each of the second stations 200.

At step 510 the first station 100 transmits a first data packet, via its transmitter 110, to each of the second stations 200. Each of the second stations 200 receiving the first data packet performs the steps 520-550.

At step 520 the first data packet is received at the second station 200 via its receiver 240.

At step 530 the control means 250 evaluates whether the first data packet is received successfully, according to a first criterion. The term "received successfully" is used to mean that the information bits contained in the data packet can be determined correctly by the receiving equipment. Such success may be the result of applying techniques such as error correction or detection, selective retransmission of portions of the information bits, or combining of more than one transmission of the data packet or information bits. The first criterion may take any of many forms, and may depend, for example, on the type of information conveyed by the data packet. Some example criteria are: a cyclic redundancy check must be satisfied; all information bits must be error free; specific information bits must be error free; fewer than a specific number of errors must be present; all information bits satisfy a reliability threshold. A skilled person can readily identify other criteria that may be used instead of, or in combination with, the above examples.

At step 540 the control means 250 forwards the first data packet, if received successfully, to the node apparatus 400 which receives the data packet via its receiver 410. In some embodiments the control means 250 may also forward some or all packets which are not received correctly to the node apparatus 400.

At step 550 the control means 250 initiates transmission by the transmitter 210 of an acknowledgement. In one embodiment a positive acknowledgement is transmitted if the first data packet is received successfully and a negative acknowledgement is transmitted if the first data packet is not received successfully. In another embodiment the only acknowledgments transmitted are positive acknowledgements, if the first data packet is received successfully. In another embodiment the only acknowledgments transmitted are negative acknowledgements, if the first data packet is not received successfully. In another embodiment negative acknowledgements are only transmitted if the first data packet is not forwarded to the node apparatus 400.

At step 560 the first station 100 receives, via its receiver 140, the acknowledgements transmitted by each of the second stations 200.

At step 570 the control means 150 counts the received acknowledgements and stores the count in the storage means 160. In one embodiment positive acknowledgements are counted. In another embodiment negative acknowledgements are counted. In another embodiment positive and negative acknowledgements are both counted separately.

At step 580 the control means 150 compares the number of acknowledgements counted with a threshold value, the threshold value being an integer greater than 1. The threshold value is stored in the storage means 160 and may be predetermined, or received by the receiver 140 from a second station 200 or from elsewhere. If positive and negative acknowledgements are both counted, separate threshold values may be used for each type of acknowledgement. Optionally, a common threshold value may be used for both positive and negative acknowledgements.

Depending on the value of the or each count relative to the corresponding threshold value, flow then either reverts to step 510 where the first data packet is transmitted again, or proceeds to step 590 where a new data packet is selected and the process repeats from step 510 with the new packet being transmitted.

If positive acknowledgements are counted, the number P of positive acknowledgements counted is compared with a first threshold value $T_P (T_P>1)$. Retransmission of the first data packet at step 510 takes place if $P<T_P$, and transmission of a new data packet takes place if $P \geq T_P$. Thus if, for example, there are five second stations 200 transmitting acknowledgements and $T_P=3$, if only one or two positive acknowledgements are received the first data packet will be retransmitted, even though the first data packet might in fact have been successfully received by one or more second stations 200 and forwarded to the node apparatus 400.

If negative acknowledgements are counted, the number N of negative acknowledgements counted is compared with a second threshold value $T_N (T_N>1)$. Retransmission of the first data packet at step 510 takes place if $N>T_N$, and transmission of a new data packet takes place if $N \leq T_N$. Thus if, for example, there are five second stations 200 transmitting acknowledgements and $T_N=2$, if only one or two negative acknowledgements are received a new data packet will be transmitted, based on the assumption that the first data packet has been successfully received by up to three second stations 200 and forwarded to the node apparatus 400.

In a further embodiment, the number of positive acknowledgements received in response to an initial transmission and to retransmissions of the first data packet is accumulated and compared by the control means 150 with a third threshold value $T_P' (T_P'>1)$. A further retransmission of the first data packet then takes place if the accumulated count is less than $T_P'$, and transmission of a new data packet takes place otherwise. $T_P'$ may be the same as or different from $T_P$.

In a further embodiment, the number of negative acknowledgements received in response to an initial transmission and to retransmissions of the first data packet is accumulated and compared by the control means 150 with a fourth threshold value $T_N' (T_N'>1)$. A further retransmission of the first data packet then takes place if the accumulated count exceeds $T_N'$, and transmission of a new data packet takes place otherwise. $T_N'$ may be the same as or different from $T_N$.

In a further embodiment, a transmitted acknowledgement may acknowledge a data packet received before the most recently received data packet. This option can improve efficiency by enabling new data to be transmitted while waiting for acknowledgement of previously transmitted data. Furthermore, an acknowledgement may acknowledge more than one data packet. This option can reduce interference by reducing the number of acknowledgements transmitted.

In a further embodiment, the period of time for which acknowledgements are counted is subject to a time limit. In this case, if negative acknowledgements are counted, retransmission of the first data packet takes place at the expiry of the time limit if the count value exceeds a fifth threshold $T_N''$ where $1<T_N''<T_N$, or if positive acknowledgements are counted, retransmission of the first data packet takes place at the expiry of the time limit if the count value does not exceeds a sixth threshold $T_P''$ where $1<T_P''<T_P$. This option can reduce delays in circumstances where a long time would be required to complete a count, or if reception by the second stations 200 is so poor that the first data packet is received by few second stations 200 such that few acknowledgements, positive or negative, are transmitted.

Optionally, the control means 150 may apply a signal reliability criterion to received acknowledgements when determining whether to retransmit the first data packet or to transmit the second data packet. The option of applying a signal reliability criterion may be used to increase the reliability of the retransmission decisions. Such a signal reliability criterion may take into account, for example, received signal amplitude, signal to interference ratio, number of bit errors or bit error rate.

For example, the signal reliability criterion may be applied to the counting of acknowledgements. In this case an acknowledgement is counted only if the signal reliability of the acknowledgement satisfies the signal reliability criterion.

The reliability criterion may comprise deriving a weighting factor, where a high weighting factor would be assigned to an acknowledgement with a high estimated reliability, while a low weighting factor would be assigned to an acknowledgement with low estimated reliability. The counting of acknowledgments may then involve a summation of the weighting factors, which may be non-integer values. The result of the summation is them compared with an appropriate one of the threshold values in order to decide whether to retransmit the first data packet.

As another example, an indication of the signal reliability of a plurality of acknowledgements of the same type, positive or negative, may be combined, for example by summing, and the combined reliability compared with a reliability threshold value for that type.

As a further example, any of the threshold values in this specification may be dependent on an indication of reliability of the acknowledgements. For example, the reliability threshold value for positive acknowledgements may be dependent on an indication of reliability of the negative acknowledgements, or the reliability threshold value for negative acknowledgements may be dependent on an indication of reliability of the positive acknowledgements.

In a variant of the invention, the reliability threshold value for one type of acknowledgement may be dependent on an indication of reliability of another type of acknowledgement, even when the decision on whether to retransmit the first data packet or to transmit the second data packet is made on a single acknowledgement of each type of acknowledgement.

Optionally, any of the threshold values may be transmitted to the first station 100 from one of the second stations 200 or from elsewhere, and stored in the storage means 160. This option may be used to adapt the threshold values to the prevailing system conditions, such as loading.

Optionally, any of the threshold values may be equal to, or alternatively a function of, the number of second stations 200. This option can be used to ensure that the number of positive acknowledgements required before the next data packet is transmitted increases as the probability of wrongly decoding negative acknowledgements as positive acknowledgements increases. Similarly, this option can be used to ensure that the number of negative acknowledgements required before a retransmission takes place increases as the probability of correct reception increases. In order to count the number of second stations 200 with which the first station is in communication, the control means 150 may monitor signals received from the second stations 200.

Optionally, an acknowledgement may be transmitted more than once by a second station 200. This option may be used to reduce the impact of wrongly decoded acknowledgements.

The functionality of a second station 200 may be provided by distributed or co-located means.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of communications and which may be used instead of or in addition to features already described herein.

The invention claimed is:

1. A method, comprising:
   transmitting a first data packet from a first station;
   receiving the transmitted first data packet at a plurality of second stations coupled to a node apparatus;
   evaluating whether the first data packet has been received successfully at each of the second stations according to a first criterion;
   when the first data packet has been received successfully by at least one second station in the plurality of second stations, forwarding the first data packet to the node apparatus from at least one second station at which the data packet is received successfully;
   transmitting at least one of:
      a positive acknowledgement from each of the second stations at which the first data packet is received successfully; and
      a negative acknowledgement from each of the second stations at which the first data packet is not received successfully;
   receiving the acknowledgements at the first station;
   comparing at least one of:
      a number of received positive acknowledgements with a first threshold value; and
      a number of received negative acknowledgements with a second threshold value;
      wherein at least one of the first and second threshold values is greater than unity; and
   employing a result of the comparison to determine whether to retransmit the first data packet or to transmit a second data packet, wherein determining whether to retransmit the first packet or to transmit a second packet further comprises applying a signal reliability criteria to the received acknowledgements, the signal reliability criteria comprising summing an indication of reliability of acknowledgements of a same type and comparing the summation with a reliability threshold value for that type.

2. A method as claimed in claim 1, comprising signaling at least one of the first and second threshold values to the first station.

3. A method as claimed in claim 1, wherein at least one of the first and second threshold values is dependent on a number of second stations with which the first station is in communication.

4. A method as claimed in claim 1, further comprising: at least one of:
   accumulating the number of positive acknowledgements received in response to the first transmission and to one or more retransmissions of the first data packet and comparing the accumulated number with a third threshold value; and
   accumulating the number of negative acknowledgements received in response to the first transmission and to one or more retransmissions of the first data packet and comparing the accumulated number with a fourth threshold value;
   wherein at least one of the third and fourth threshold values is greater than unity; and
   employing the result of the comparison to determine whether to retransmit the first data packet or to transmit the second data packet.

5. A method as claimed in claim 4, comprising signaling at least one of the third and fourth threshold values to the first station.

6. A method as claimed in claim 4, wherein at least one of the third and fourth threshold values is dependent on a number of second stations with which the first station is in communication.

7. A method as claimed in claim 4, wherein the third threshold value is equal to the first threshold value or the fourth threshold value is equal to the second threshold value.

8. A method as claimed in claim 1 wherein at least one of the first and second threshold values is dependent on the signal reliability.

9. A method as claimed in claim 1 wherein the acknowledgement types comprise positive and negative acknowledgements and wherein the reliability threshold value for one of the acknowledgement types is dependent on an indication of signal reliability of the other type.

10. A method as claimed in claim 1, wherein the acknowledgements comprise positive acknowledgements, the method further comprising:
    determining a number P of positive acknowledgements that are received at the first station;
    comparing the number P to a threshold value TP;
    retransmitting the first data packet from the first station if P is less than TP; and
    transmitting the second data packet from the first station if P is greater than or equal to TP.

11. A method as claimed in claim 10, further comprising applying a signal reliability criterion when determining the number P.

12. A method as claimed in claim 1, wherein the acknowledgements comprise negative acknowledgements, the method further comprising:
    determining a number N of negative acknowledgements that are received at the first station;
    comparing the number N to a threshold value TN;
    retransmitting the first data packet from the first station if N is greater than TN; and
    transmitting the second data packet from the first station if N is less than or equal to TN.

13. A method as claimed in claim 12, further comprising applying a signal reliability criterion when determining the number N.

14. A method as claimed in claim 1, wherein the first station is a mobile station and the second stations are base stations, and the method is performed during soft handover of the mobile station between the base stations.

15. A communication system comprising a first station and a node apparatus coupled to a plurality of second stations for communicating data packets from the first station to the node apparatus,
    the first station comprising transmitter means for transmitting a first data packet, each second station comprising:
  means for receiving the first data packet;
  means for evaluating whether the first data packet has been received successfully according to a first criterion;
  means for forwarding the first data packet to the node apparatus if the first data packet has been received successfully;
  means for transmitting at least one of:
    a positive acknowledgement if the first data packet is received successfully; and
    a negative acknowledgement if the first data packet is not received successfully;
the node apparatus comprising means for receiving the forwarded first data packet;
the first station further comprising:
  means for receiving the acknowledgements;
  means for comparing at least one of:
    a number of received positive acknowledgements with a first threshold value; and
    a number of received negative acknowledgements with a second threshold value;
    where at least one of the first and second threshold values is greater than unity; and
  means for employing the result of the comparison to determine whether to retransmit the first data packet or to transmit a second data packet, the means for employing including means for applying a signal reliability criterion to the received acknowledgements, the signal reliability criterion comprising summing an indication of reliability of acknowledgements of a same type and comparing the summation with a reliability threshold value for that type.

16. A communication system as claimed in claim 15, the first station further comprising means for receiving a signaled value of at least one of the first and second threshold values.

17. A communication system as claimed in claim 15, the first station further comprising means for selecting a value for at least one of the first and second threshold values dependent on a number of second stations with which the first station is in communication.

18. A communication system as claimed in claim 17, the first station further comprising:
  means for at least one of
    accumulating a number of positive acknowledgements received in response to the first transmission and to one or more retransmissions of the first data packet and for comparing the accumulated number of positive acknowledgements with a third threshold value; and
    accumulating a number of negative acknowledgements received in response to the first transmission and to one or more retransmissions of the first data packet and for comparing the accumulated number of negative acknowledgements with a fourth threshold value;
    wherein at least one of the third and fourth threshold values is greater than unity; and
  means for employing the result of the comparison to determine whether to retransmit the first data packet or to transmit the second data packet.

19. A communication system as claimed in claim 18 the first station further comprising means for receiving a signaled value of at least one of the third and fourth threshold values.

20. A communication system as claimed in claim 18, the first station further comprising means for selecting a value for at least one of the third and fourth threshold values dependent on the number of second stations with which the first station is in communication.

21. A communication system as claimed in claim 15 wherein at least one of the first and second threshold values is dependent on the signal reliability.

22. A communication system as claimed in claim 15 wherein the acknowledgement types comprise positive and negative acknowledgements and wherein the reliability threshold value for one of the acknowledgement types is dependent on an indication of signal reliability of the other type.

23. A communication system as claimed in claim 15, wherein the second stations comprise means to transmit positive acknowledgements and the first station further comprises:
  means for determining a number P of the positive acknowledgements received;
  means for comparing the number P to a threshold value TP;
  means for retransmitting the first data packet if P is less than TP and for transmitting the second data packet if P is greater than or equal to TP.

24. A communication system as claimed in claim 23, the first station further comprising means for applying a signal reliability criterion when determining the number P.

25. A communication system as claimed in claim 15, wherein the second stations comprise means to transmit negative acknowledgements and the first station further comprises:
  means for determining a number N of the negative acknowledgements received;
  means for comparing the number N to a threshold value TN;
  means for retransmitting the first data packet if N is greater than TN and for transmitting the second data packet if N is less than or equal to TN.

26. A communication system as claimed in claim 25, the first station further comprising means for applying a signal reliability criterion when determining the number N.

27. A first communication station, comprising:
  a transmitter configured to transmit a first data packet to a node apparatus through a plurality of second communication stations;
  a receiver configured to receive acknowledgements from the second stations; and
  a controller configured to:
    compare a number of received positive acknowledgements with a first threshold value;
    compare a number of received negative acknowledgements with a second threshold value, wherein a least one of the first and second threshold values is greater than unity; and
    determine whether to retransmit the first data packet or to transmit a second data packet, wherein the controller is configured to apply a signal reliability criterion to the received acknowledgements when determining whether to retransmit the first data packet or to transmit the second data packet and applying the signal reliability criterion comprises summing an indication of reliability of acknowledgements of a same type and comparing the summation with a reliability threshold value for that type.

28. A first communication station as claimed in claim 27 wherein the receiver is configured to receive a signaled value of at least one of the first and second threshold values.

29. A first communication station as claimed in claim 27 wherein the controller is configured to select a value for at least one of the first and second threshold values dependent on a number of second stations with which the first station is in communication.

30. A first communication station as claimed in claim 27 wherein the controller is configured to:
perform at least one of:
accumulate a number of positive acknowledgements received in response to the first transmission and to one or more retransmissions of the first data packet and compare the accumulated number with a third threshold value; and
accumulate a number of negative acknowledgements received in response to the first transmission and to one or more retransmissions of the first data packet and compare the accumulated number with a fourth threshold value; wherein at least one of the third and fourth threshold values is greater than unity; and
employ the result of the comparison to determine whether to retransmit the first data packet or to transmit a second data packet.

31. A first station as claimed in claim 30 wherein the receiver is configured to receive a signaled value of at least one of the third and fourth threshold values.

32. A first station as claim in claim 30 wherein the controller is configured to select a value for at least one of the third and fourth threshold values dependent on a number of second stations with which the first station is in communication.

33. A first station as claimed in claim 30, wherein the third threshold value is equal to the first threshold value or the fourth threshold value is equal to the second threshold value.

34. A first station as claimed in claim 27 wherein at least one of the first and second threshold values is dependent on the signal reliability.

35. A first station as claimed in claim 27 wherein the acknowledgement types comprise positive and negative acknowledgements and wherein the reliability threshold value for one of the acknowledgement types is dependent on an indication of signal reliability of the other type.

36. A first station as claimed in claim 27 wherein the controller is configured to:
determine a number P indicative of positive acknowledgements received;
compare the number P to a threshold value TP;
cause retransmission of the first data packet if P is less than TP and cause transmission of the second data packet if P is greater than or equal to TP.

37. A first station as claimed in claim 36 wherein the controller is configured to apply a signal reliability criterion when determining the number P.

38. A first station as claimed in claim 27 wherein the controller is configured to:
determine a number N indicative of negative acknowledgements received;
compare the number N to a threshold value TN;
cause retransmission of the first data packet if N is greater than TN and cause transmission of the second data packet if N is less than or equal to TN.

39. A first station as claimed in claim 38 wherein the controller is configured to apply a signal reliability criterion when determining the number N.

* * * * *